UNITED STATES PATENT OFFICE.

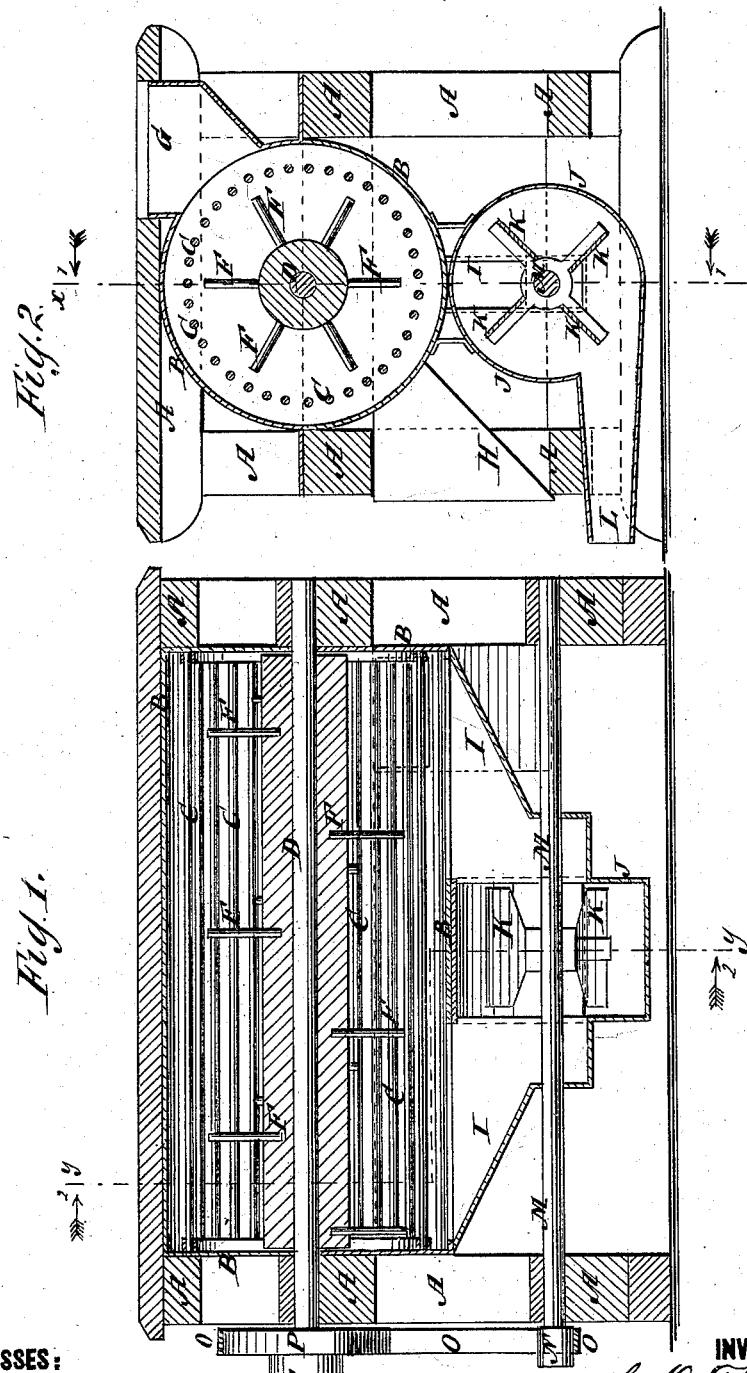

CHARLES O. THOMAS AND THOMAS ROBERTSON, OF MURFREESBOROUGH, TENNESSEE.

IMPROVEMENT IN COTTON-CLEANERS.

Specification forming part of Letters Patent No. 192,951, dated July 10, 1877; application filed October 30, 1876.

*To all whom it may concern:*

Be it known that we, CHARLES O. THOMAS and THOMAS ROBERTSON, of Murfreesborough, county of Rutherford and State of Tennessee, have invented a new and Improved Cotton Duster and Cleaner, of which the following is a specification:

In the accompanying drawing, Figure 1 is a vertical longitudinal section of our improved machine, taken through the line X X, Fig. 1, looking in the direction of arrows 1; and Fig. 2 is a detail cross-section of the same, taken through the line Y Y, Fig. 2, looking in the direction of arrows 2.

Similar letters of reference indicate corresponding parts.

The object of this invention is to furnish an improved machine for removing dust, sand, and dirt from seed-cotton before it is ginned, and which shall be simple in construction, convenient in use, and effective in operation, producing a much better sample of lint-cotton than when ginned without being cleaned.

The invention will first be described in connection with the drawing, and then pointed out in the claim.

In the drawing, A is a frame, to the upper part of the ends of which are attached the ends of a hollow cylinder, B. To the ends of the cylinder B are attached the ends of a circle of rods, C, which are placed about two inches from the walls of the said cylinder B. Through the center of the cylinder B passes a shaft, D, the journals of which revolve in bearings attached to the ends of the frame A, and to one of the said journals is attached a pulley, E, to receive the band by which power is applied to said shaft. To the shaft D are attached a series of radial pins, F, of such a length as to reach nearly to the rods C, and which are arranged spirally upon the shaft D, so as to feed the cotton from the head toward the tail of the cylinder B at the same time that they knock the dust and dirt from it.

The cotton is fed in through the hopper G, which is connected with a hole in the upper part of the side of the cylinder B, at its head end, and is discharged through the spout H, connected with a hole in the lower part of the opposite side of said cylinder, at its tail end. The rods C are cut away opposite the said holes to allow the cotton to pass in and out. As the dirt and dust are knocked out of the cotton they fall through the spaces between the rods C, and pass through long narrow slots in the bottom of the cylinder B into the spouts I, through which they pass into the case J of the exhaust-fan, and are blown out by the fans K through the discharge-spout L.

The fans K are attached to a shaft, M, that revolves in bearings attached to the frame A, and to its end is attached a pulley, N, to receive the band O, which also passes around a large pulley, P, attached to the shaft D.

Having thus described our invention, we claim as new and desire to secure by Letters Patent—

The combination of cylinder B, provided with an inner circle of longitudinal rods, C, and the central rotary shaft, having spirally-arranged pins F, the latter beating the cotton against the rods, and carrying it round and round the cylinder until the discharge is reached, for the purpose specified.

CHARLES O. THOMAS.
THOMAS ROBERTSON.

Witnesses:
CHAS. R. HOLMES,
JAMES O. OSLIN.